(12) United States Patent
Fukuda

(10) Patent No.: US 7,184,501 B1
(45) Date of Patent: Feb. 27, 2007

(54) METHOD OF SYNCHRONOUS SERIAL COMMUNICATION AND SYSTEM FOR SYNCHRONOUS SERIAL COMMUNICATION

(75) Inventor: Michitaka Fukuda, Tokyo (JP)

(73) Assignee: Canon Finetech Inc., Mitsukaido (JP)

( * ) Notice: Subject to any disclaimer, the term of this patent is extended or adjusted under 35 U.S.C. 154(b) by 0 days.

(21) Appl. No.: 09/937,611

(22) PCT Filed: Mar. 31, 2000

(86) PCT No.: PCT/JP00/02097

§ 371 (c)(1),
(2), (4) Date: Jan. 8, 2002

(87) PCT Pub. No.: WO00/58845

PCT Pub. Date: Oct. 5, 2000

(30) Foreign Application Priority Data

Mar. 31, 1999 (JP) .................................. 11-094369

(51) Int. Cl.
*H04L 7/00* (2006.01)
(52) U.S. Cl. ................. 375/354; 340/825.62; 713/375; 709/248
(58) Field of Classification Search ................ 375/354, 375/358, 369; 713/375, 400; 709/248
See application file for complete search history.

(56) References Cited

U.S. PATENT DOCUMENTS

| | | | |
|---|---|---|---|
| 4,825,286 A * | 4/1989 | Graves ........................ 348/484 |
| 5,376,968 A * | 12/1994 | Wu et al. ............... 375/240.14 |
| 5,557,754 A | 9/1996 | Sone et al. .................. 710/107 |
| 5,649,074 A * | 7/1997 | Welborn .................... 358/1.15 |
| 6,108,723 A * | 8/2000 | Simms et al. .................. 710/35 |
| 6,580,827 B2 * | 6/2003 | Ueda ........................... 382/232 |
| 2005/0031033 A1 * | 2/2005 | Kato ..................... 375/240.01 |

FOREIGN PATENT DOCUMENTS

| | | |
|---|---|---|
| EP | 0367093 | 5/1990 |
| EP | 0 613 300 A2 | 8/1994 |

(Continued)

OTHER PUBLICATIONS

Communication pursuant to Article 96(2) EPC from the European Patent Office dated Mar. 16, 2004.

(Continued)

*Primary Examiner*—Temesghen Ghebretinsae
*Assistant Examiner*—Juan Alberto Torres
(74) *Attorney, Agent, or Firm*—Crowell & Moring LLP

(57) ABSTRACT

A method and system for serial communication capable of increasing the speed of the transmission of serial data are provided. A block mode is employed if transmission of serial data having a specific length is required, and under which data to be transmitted are divided into plural blocks, and firstly transmitted is block information that notifies which blocks out of the entire blocks will be transmitted, and then transmitted are the data included in the blocks notified by the block information. The burst mode is a mode under which the block information which is currently transmitted is compared with the block information which was previously transmitted, and, if the two are the same, transmission of the data is introduced, while the block information being omitted. The system attached mode information notifying the mode through which data will be transmitted, to the data to be transmitted.

19 Claims, 16 Drawing Sheets

FOREIGN PATENT DOCUMENTS

| | | | |
|---|---|---|---|
| EP | 0613300 | | 8/1994 |
| EP | 0378762 | | 11/1994 |
| EP | 0628492 | | 12/1994 |
| EP | 0 725 485 A2 | | 8/1996 |
| EP | 0725485 | | 8/1996 |
| EP | 0 895 400 A2 | | 2/1999 |
| EP | 0895400 | | 2/1999 |
| JP | 5539953 | | 3/1980 |
| JP | 63-254554 | * | 10/1988 |
| JP | 63254554 | | 10/1988 |
| JP | 8-221224 | | 8/1996 |
| JP | 8314847 | | 11/1996 |
| JP | 10-289172 | | 10/1998 |

OTHER PUBLICATIONS

Communication pursuant to Article 96(2) EPC from the European Patent Office dated Sep. 3, 2003.

Translation of Notification of the First Office Action and first Office Action from the Patent Office of the People's Republic of China dated Feb. 14, 2003.

A Notification of the Second Office Action and second Office Action from the Patent Office of the People's Republic of China dated Oct. 19, 2003.

European Search Report.

* cited by examiner

METHOD OF SYNCHRONOUS SERIAL COMMUNICATION AND SYSTEM FOR SYNCHRONOUS SERIAL COMMUNICATION

TECHNICAL FIELD

The present invention relates to a method for synchronous serial communication whereby it is possible to transmit serial data in synchrony with timing signals, and a system for synchronous serial communication based on the use of the method.

BACKGROUND ART

The method for serial communication has been known as one of the methods for transmitting data serially, and many variations of the method have been devised. Serial data communication is characterized by that it requires a comparatively few communication lines, and that it allows comparatively easy data control. Because of these features, the method for serial data communication has been widely adopted by the communication systems of various fields.

However, serial data communication requires a comparatively long time if data to be transmitted are large in volume. Further, if a series of data have been dispatched, and a change must be added to the data later, usually all the data including the change must be transmitted anew. Thus, even if the change only involves a single data of the previous data, all the previous data and clock signals corresponding with those data must be transmitted anew. Because of these inconveniences, the conventional serial data communication requires a comparatively long time particularly when a data change must be added later.

Here description will be given below about the problems encountered with the conventional serial data communication, taking as an example an image forming system based on thermal ink jet printing. According to the thermal ink jet-based image forming system, a driving pulse is applied to an electro-thermal transducer element attached to an ink ejection nozzle, thereby causing a bubble to develop in ink within the ink passage leading into the nozzle; the bubble gives a sufficiently high pressure upon the ink droplet remaining close to the nozzle, to force it out as an ink jet; and the ink jet is allowed to hit against a sheet of recording paper, to print a dot there.

Such an image forming system adopts serial signal transmission in order to transmit printing data from an engine portion to a recording head portion. The engine portion or the transmitter delivers, for example, data necessary for printing a line to a memory means on the side of the receiver. For this data transmission to be properly achieved through serial data communication, clock signals are used for informing which data should be assigned to which locations of the memory means. If the memory means has, for example, eight addresses, each address having a 1 byte width, the number of cells to accept data will count 8×8 or 64 in total. Thus, if it is required for the system to transmit data necessary for one line printing, the system will transmit 64 clock signals through a clock line, and data correspondent with those clock signals through a data line, so that data necessary for printing a line can be properly stored in the memory means of the recording head portion. The image forming system taken as an example here for illustration requires at least 64 clock signals for the transmission of data necessary for printing a line. If the image forming system must print a full color image, it will incorporate four printer heads, and thus data necessary for printing a line of a color image will become large in volume, and the number of clock signals will increase in association, which will unduly lengthen the time necessary for printing.

The recording method based on ink jet printing poses another problem: the amount of the ink droplet will vary depending on the temperature of the ink jet element from which the droplet is spat out. In order to meet this situation, a temperature sensor is attached to each nozzle to detect the temperature of the nozzle, and a feedback control is introduced for altering the width of a driving pulse applied to the ink jet element according to the temperature of the element. Accordingly, the system may meet a situation where, after data necessary for printing have been delivered by the engine portion to the printing portion, the system decides to change the width of a driving pulse to be applied to a certain ink jet element in response to a detection signal from the temperature sensor of that element, and must add the change to a certain part of the data previously delivered. To put it more specifically, the system may meet a situation where, when formation of an image is started, and, during the formation, the temperature of a certain ink jet element is elevated, the system must reduce the width of a driving pulse to be applied to the ink jet element in question and add the change to the data previously sent. If the conventional image forming system meets such a situation, the system containing a memory means on the receiver side having 64 cells as described above, the system will send anew 64 clock signals, and the data to be changed in synchrony with a clock signal corresponding to a cell at which data to be changed are stored. As discussed above, according to the conventional serial data communication, even if a change must be added only to a single data out of 64 data, 64 clock signals must be sent anew together with the change, just as if all the data had to be changed. Namely, according to the conventional serial data communication, changing of the previously sent data requires an unduly long time.

This invention was proposed with the above situation as a background, and aims at providing a method for synchronous serial communication capable of increasing the transfer speed of serial data, and a system for synchronous serial communication based on the method.

DISCLOSURE OF THE INVENTION

To achieve the above object, the method of this invention for synchronous serial communication comprising the step of transmitting data serially through data lines in synchrony with timing signals sent through clock line, wherein, if the transmission of a specified length of serial data is required, transmission of the data is achieved by dividing the data for transmission into a plurality of blocks, firstly transmitting block information notifying the block(s) to be transmitted, and then transmitting the data included in the block(s) notified by the block information, and, on the data included in the block(s) not notified, the corresponding previous data stored in the data receiving component are used (second mode).

The method is preferably modified so that the block information which is currently transmitted is compared with the block information which was previously transmitted, and, if the two are the same, the current block information is omitted, and the data included in the block(s) corresponding to the one(s) notified by the previous block information are transmitted (third mode).

Further, the method is preferably modified so that there are available three communication modes including, as a first mode, the conventional synchronous serial communication under which data are transmitted, not being divided into blocks; the second mode as described above; and the third mode as described above, and, if it is required to transmit data, mode information notifying under which mode the transmission of the data will be achieved is attached to the data to be transmitted.

BEST MODE FOR CARRYING OUT THE INVENTION

1st Embodiment

Figure 1:
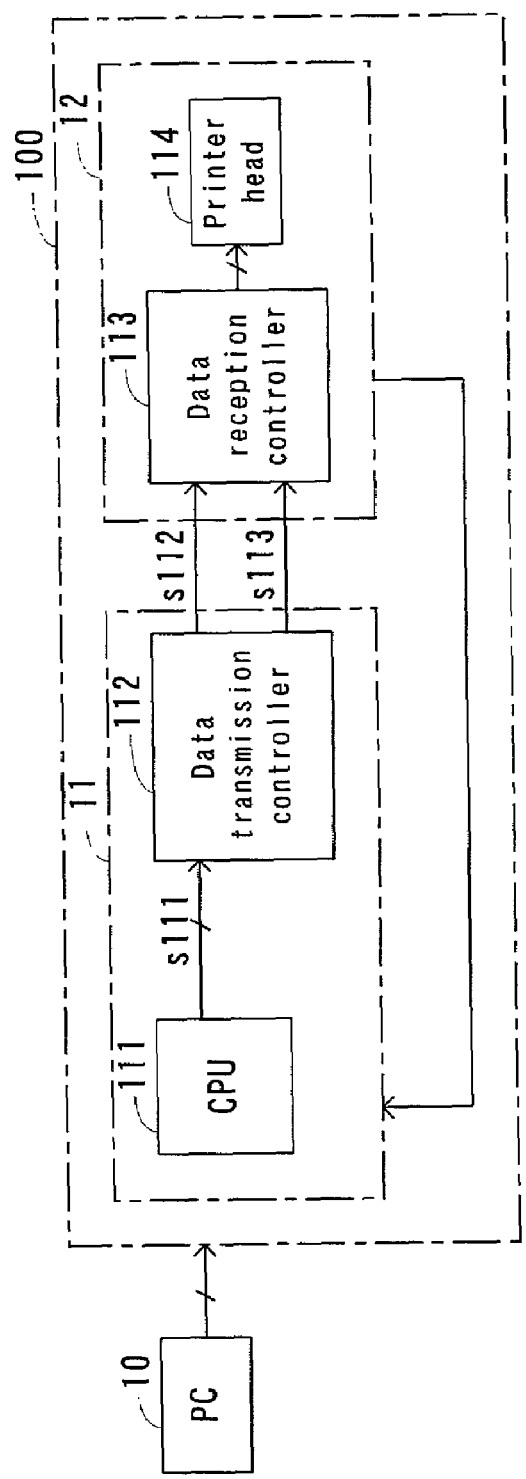
FIG. 1 is a schematic diagram to indicate the outline of an image forming system based on thermal ink jet printing representing a first embodiment of this invention.

[Constitution] A first embodiment of this invention will be described below with reference to attached figures. FIG. 1 is a schematic diagram to indicate the outline of an image forming system based on thermal ink jet printing representing a first embodiment of this invention. The image forming system 100 based on thermal ink jet printing shown in FIG. 1 comprises an engine portion 11 including a CPU 111 and a data transmission controller 112, and a recording head portion 12 including a data reception controller 113 and a printer head 114. Data transmission controller 112 is connected through a bus to CPU 111, and writes data in response to an instruction from CPU 111, or receives an instruction from CPU 111 for starting communication. Data transmission controller 112, on receipt of an instruction from CPU 111 for starting communication, determines which mode out of the communication modes described below will be most suitable for transmitting the data in a shortest possible time, adds the communication mode information informing the communication mode thus chosen to the data to be transmitted, and sends the resulting data through serial data communication to the data reception controller 113. This system communicates data between data transmission controller 112 and data reception controller 113 through synchronous serial communication. The data to be transmitted s111 are delivered through a data line in synchrony with clock signals s113 delivered through a clock line.

[Communication mode] The serial data communication responsible for the communication of data between the data transmission controller and the data reception controller of this embodiment includes three modes called a full mode, block mode and burst mode. The full mode defines the ordinary synchronous serial communication in which data are transmitted in synchrony with serial signals. The block mode defines the communication in which, if the transmission of a specified length of serial data is required, the data to be transmitted are divided into a plurality of blocks, and first block information is sent to indicate the blocks to be transmitted, and then the data included in the blocks indicated by the block information, to achieve thereby data communication. The burst mode defines the communication in which the system compares the block information of current transmission with the block information of previous transmission, and, when it finds the two are the same, the systems omits the block information, and will transmit the data included in the blocks to be transmitted. Data transmission controller attaches to the data sent from CPU, the mode information for indicating by what mode the data will be delivered, and sends the data to data reception controller.

Figure 2:
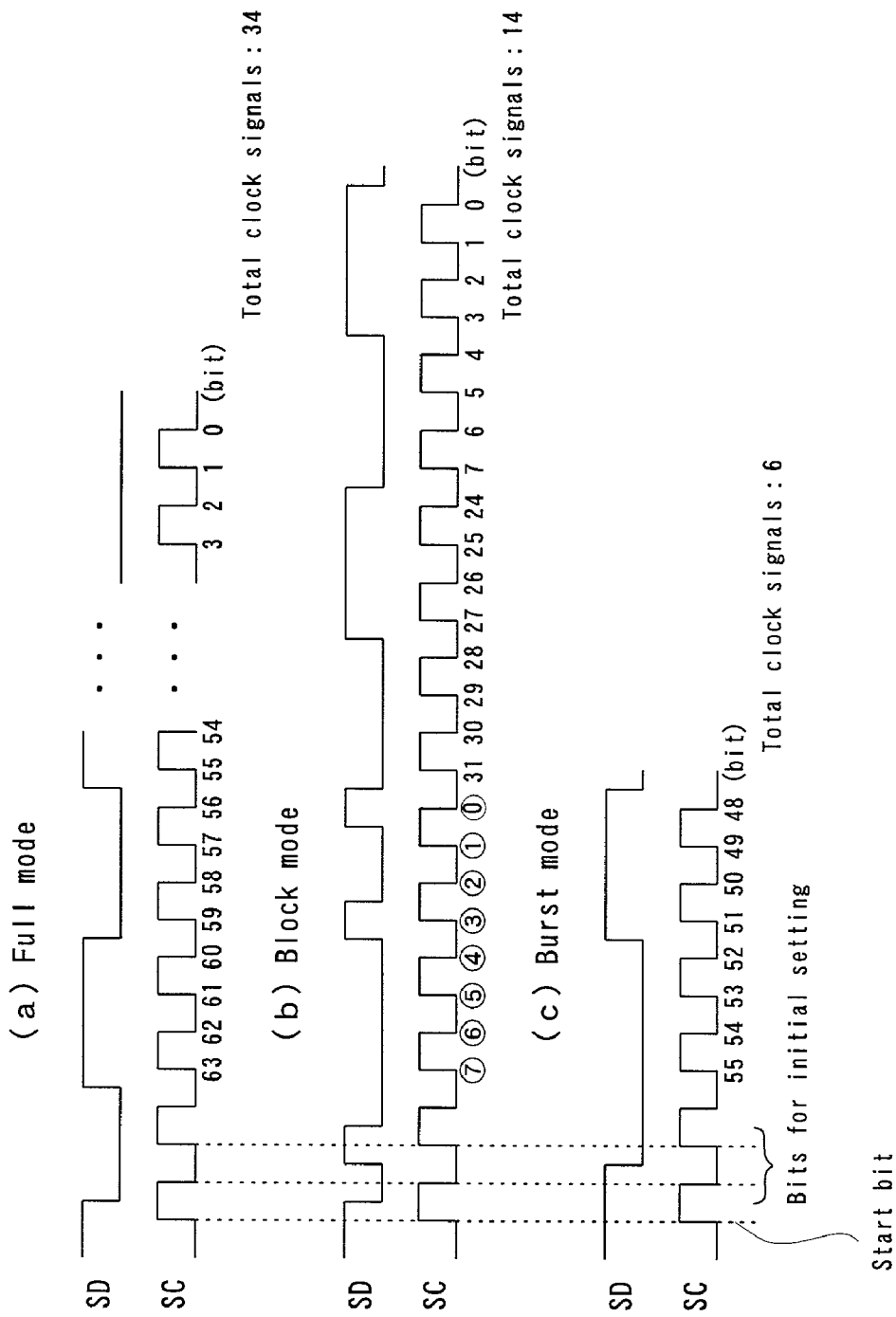
FIG. 2 illustrates how data transfer is achieved by the three modes.
Figure 3:
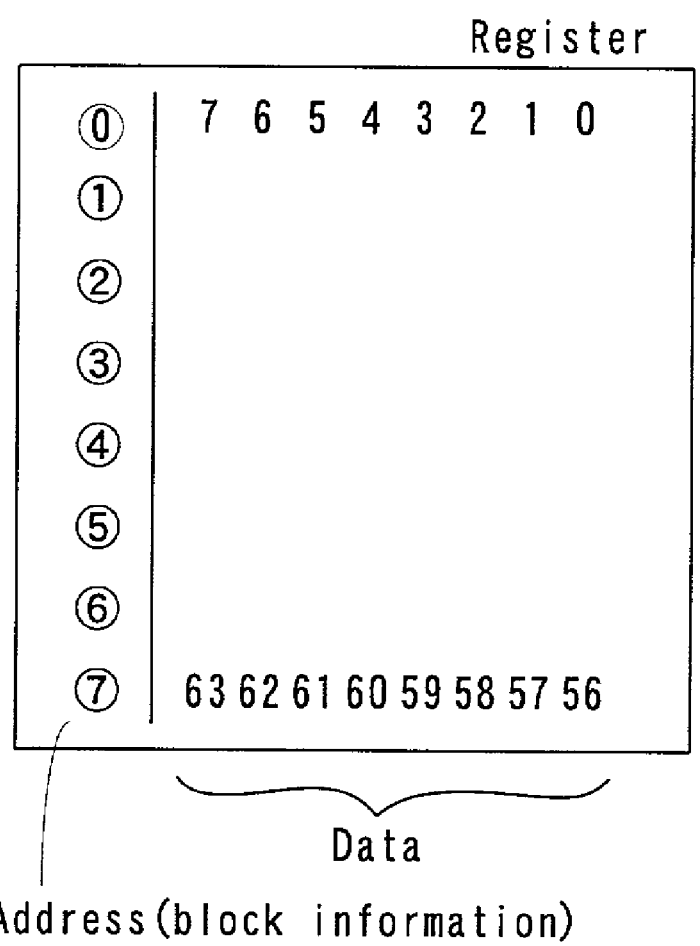
FIG. 3 is a schematic diagram of a data register which stores data received by a data reception controller.

FIG. 2 illustrates how data transfer is achieved by the three modes. FIG. 2(a) shows the signal pattern when data transmission is achieved through the full mode; FIG. 2(b) the signal pattern when data transmission is achieved through the block mode; and FIG. 2(c) the signal pattern when data transmission is achieved through the burst mode. In the figures, SD represents data to be transmitted while SC clock signals. A bit introduced at the left end of clock signals represents a start bit. The reason for the introduction of a start bit is to protect the system against failed operations in the presence of noises. If a start bit is transmitted, when the start bit is at high level, transmission of the data will start. The second and third bits notify mode information for setting the communication mode. If the data corresponding to the second and third bits are both zero (0), the communication mode through which the data will be transmitted will be the full mode shown in FIG. 2(a). If the data corresponding to the second and third bits are zero (0) for the former and one (1) for the latter, the communication mode responsible for data transmission will be the block mode shown in FIG. 2(b). If the data corresponding to the second and third bits are one (1) for the former and zero (0) for the latter, the communication mode for data transmission will be the burst mode shown in FIG. 2(c). Then, data transmission based on the three communication modes will be described with reference to FIG. 3. FIG. 3 is a schematic diagram of a data register which stores data received by the data reception controller. In the figure, circled figures represent addresses. Thus, the number of addresses of this data register is eight (8). Each address can contain one (1) byte of data. Accordingly, the data register shown in the figure can store 8×8 bits, or 64 bits of data.

Let's assume now the data transmission controller will transmit data based on the full mode to the data reception controller. Then, the data transmission controller will set data corresponding to a start bit to 1, and both of the data corresponding to 2nd and 3rd bits to 0, and then transmit the 64 data in order from the most significant bit to the least significant bit in correspondence with 64 clock signals. When the data reception controller receives a series of data as shown in FIG. 2(a), it finds, by recognizing the data corresponding to the second and third bits which are sent following a start bit are both at 0, the data will be transmitted through the full mode. Then, the same controller will store the data appearing from the fifth (5th) bit onward one after another with 8 bits as a unit into each address of the data register as shown in FIG. 3. Accordingly, if data transmission occurs on the full mode, 68 bits or 34 clock signals will be required for the data transmission.

Let's assume now the data transmission controller will transmit data based on the block mode. Then, the controller will set data corresponding to a start bit to 1, and the data corresponding to 2nd and 3rd bits to 0 and 1, then set the block information for indicating the blocks to be transmitted from the highest block to the lowest block in order. The controller will send the data included in the blocks which are set by the block information, one after another with 8 bits in order from high-order bit. With regard to the example shown in FIG. 2(b), the data are set at 1 to the 9th and 12th bits in terms of clock signals. This indicate changes are introduced in the 3rd block (data corresponding to 31st to 24th bit) and in the 0th block (data corresponding to 7th to 0th bit). At this time, since the data in the other blocks are not changed, the data in the other blocks will not be transmitted. In FIG. 2(b), a change is introduced as a 0Fhex (hexadecimal data). When the data reception controller receives a series of data as shown in FIG. 2(b), it predicts, by recognizing the data corresponding to the second and third bits which are sent following a start bit are 0 and 1, the data will be transmitted through the block mode. Then, the same controller recognizes the data continuing from 5th to 12th bits in terms of clock signals carry the information about the blocks transmitted. If data transmission based on the block mode occurs as shown in FIG. 2(b), it indicates changes are introduced in the blocks 3 and 0, but the other blocks remain unchanged. When data transmission occurs based on the block mode, changed data will be delivered one after another with 8 bit from 13rd bit onward in terms of clock signals. In the particular example shown in FIG. 2(b), two blocks of data amounting to 16 bits in total are delivered. Accordingly, when the two blocks of data are delivered through the block mode as shown in FIG. 2(b), the data will require, for their delivery, 28 bits or 14 clock signals. If the same amount of data were delivered through the full mode, it would require 34 clock signals as was indicated with reference to FIG. 2(a). Therefore, data transmission based on the block mode could save a time corresponding to 20 clock signals, as compared with data transmission based on the full mode. That is, the block information notifying the block(s) to be transmitted is transmitted first, and then the data included in the block(s) notified by the block information is transmitted, while the data included in the block(s) not notified is not transmitted, and the object of the present invention to improve the transfer speed can be achieved.

Let's assume now the data transmission controller will transmit data based on the burst mode. Then, the controller will set data corresponding to a start bit to 1, and the data corresponding to 2nd and 3rd bits to 1 and 0. Then, the controller will transmit the data included in the blocks changed in a descending order from the 5th bit onward one after another with 8 bits. With regard to the particular example shown in FIG. 2(c), out of the data previously sent, only the 6th block of data (data corresponding to 55th to 48th bit) is currently changed into a 0Fhex data. When the data reception controller receives a series of data as shown in FIG. 2(c), it predicts, by recognizing the data corresponding to the second and third bits which are sent following a start bit are 1 and 0, the data will be transmitted through the burst mode. Then, the same controller will write the data transmitted from 5th bit onward one after another with 8 bit over the corresponding blocks previously delivered. With regard to the particular example shown in FIG. 2(c), the data reception controller receives an 8 bit of data which will replace the 6th block of data previously delivered. In this case, data transmission completes in a time corresponding to 6 clock signals in total. Accordingly, replacing the previous blocks using the burst mode will save a time corresponding to 28 clock signals as compared with the case where the same purpose would be achieved by the conventional full mode, or in other words, transmitting data through the burst mode will shorten the transmission time by a time corresponding to 28 clock signals, as compared with the conventional data transmission based on the full mode.

Figure 4:
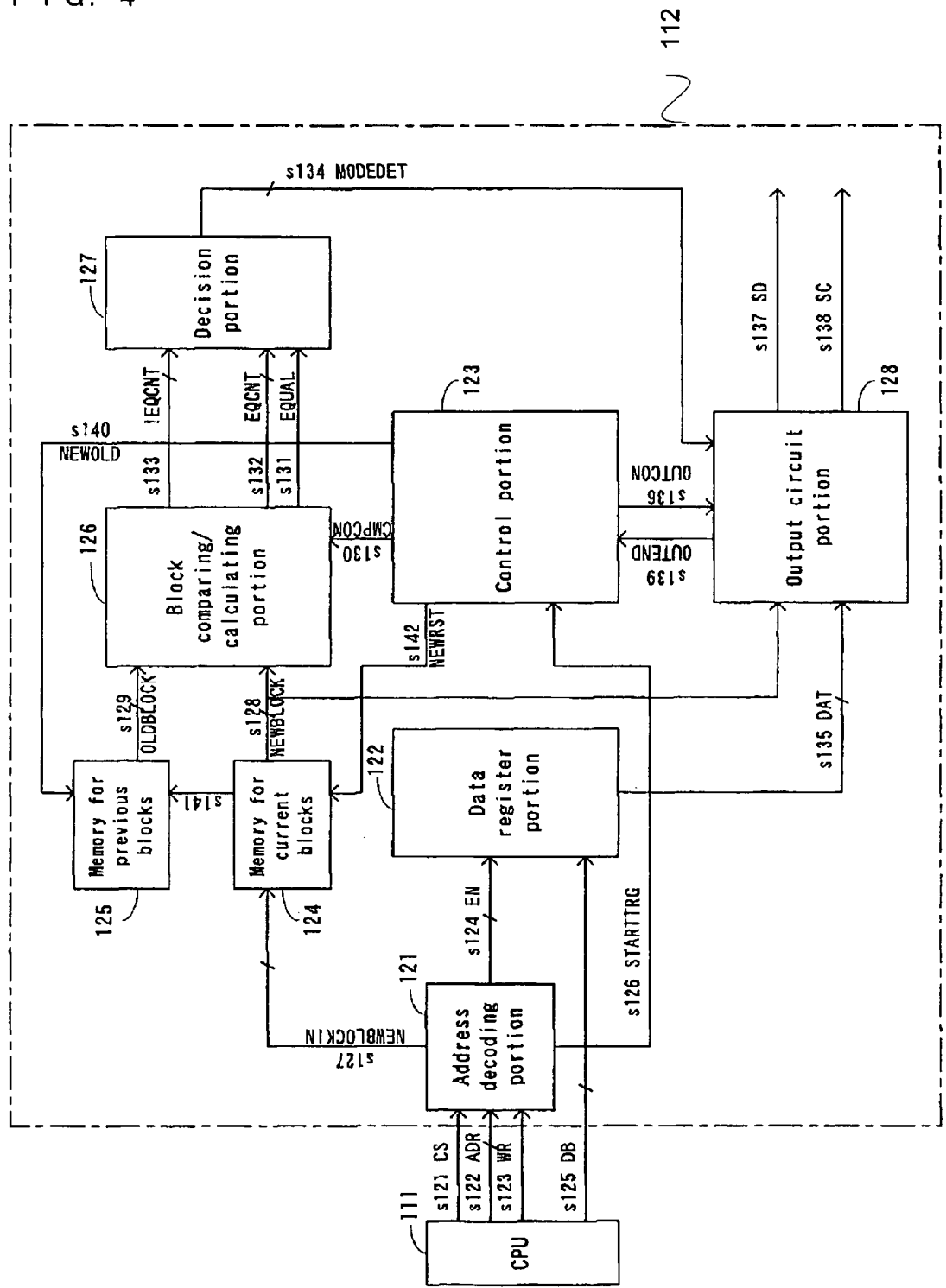
FIG. 4 is a block diagram of a data transmission controller.

[Constitution of data transmission controller] Next, the data transmission controller will be described with reference to FIG. 4. FIG. 4 is a block diagram of the data transmission controller 112. The data transmission controller 112 comprises an address decoding portion 121 which decodes address data sent by a CPU, and determines the locations into which the data received should be written; a data register 122 which temporarily stores the data sent by the CPU in the locations nominated by the address decoding portion 121; a memory 124 for current blocks which stores currently changed blocks of data; a memory 125 for previous blocks which stores previously changed blocks of data; a block comparing/calculating portion 126 which checks by comparison whether or not the current block information are the same with the previous ones, and, if transmission of a data is required, calculates the number of clock signals required for the transmission of the data for each of the three communication modes; a decision portion 127 which decides the communication mode most suitable for the transmission of the data, based on the comparison/calculation results from the block comparing/calculating portion 126; an output circuit portion 128 which transmits the data stored in the data register portion 122 through the mode recommended by the decision portion 127; and a control portion 123 which controls the operations of the memory for current block, memory for previous block, block comparing/calculating portion, output circuit portion, etc.

[Operation of data transmission controller] CPU 111 creates a chip select signal s121, write signal s123, addresses s122 and data s125 based on the data sent from external personal computers or the like and sends them to the data transmission controller 112. In the data transmission controller, the address decoding portion 121 analyzes addresses sent from CPU, and dispatches enable signals s124 according to which the locations of data register portion 122 to which data should be written are determined. The enable signal is a 8 bit bus, and makes it possible to replace the data assigned to a certain address of the data register with a new data, by changing the bit corresponding to that address to 1, thereby nominating the address at which replacement should occur. The address decoding portion 121 obtains the information s127 notifying which block of data have been currently updated, based on the addresses s123 sent from CPU, and sends the information s127 to the memory for current blocks. In addition, address decoding portion 121, on receipt of a signal for starting data transmission from CPU, sends a start trigger signal s126 to the control portion 123. Control portion 123, on receipt of the start trigger signal s126, creates an instruction signal s130 and sends the signal to the block comparing/calculating portion 126 to urge it to compare the block information s128 about the blocks currently written which is stored in the memory for current blocks with the corresponding information s129 about the blocks previously written which is stored in the memory for previous blocks, and to calculate the number of clock signals required for the transmission of data to be currently transmitted for each of the three communication modes. The block comparing/calculating portion 126, on receipt of the instruction signal s130 from the control portion, compares the current block information s128 with the previous block information s129, and, when it finds the two are coincident with each other, it will send a status signal s131 to the decision portion. And the block comparing/calculating portion 126 calculates the number of clock signals required for transmitting those data on the burst mode and on the block mode, and sends signals s132 and s133 representing the calculation results for the two modes to the decision portion.

The decision portion 127, on receipt of a status signal s131 informing the blocks to be currently transmitted coincide with the blocks previously transmitted, determines whether the current data transmission should be made on the mode giving the less calculation result out of values of signals s132 and s133 (or whether the current data transmission should occur on the block mode or on the burst mode), or whether all the data should be transmitted on the full mode to replace all the data stored in the data register 122. On the contrary, when the decision portion does not receive a status signal s131, that is, when it finds the blocks to be transmitted currently do not coincide with those previously transmitted, the portion in question determines whether the current data to replace the previous data should be transmitted on the block mode or on the burst mode. The decision made by the decision portion is transmitted as a mode information s134 to output circuit portion 128.

Output circuit portion 128, based on the mode information s134, the block information s128 about the currently fed blocks, and the register value s135 of data register 122, creates serial data s137 formatted according to the mode information, and transmits the serial data s137 and the clock signals s138 to the data reception controller in response to an output circuit trigger s136 sent from control portion 123. Output circuit portion 128, on having transmitted those data, quickly informs control portion 123 of the completion of output transmission by sending an output completion signal s139 to the latter. Control portion 123, on receipt of the output completion signal s139, with an intention to transfer the block information s128 for the memory 124 for current blocks to the memory 125 for the previous blocks, creates a write enable signal s140 and transmits it to the memory for previous blocks. Then, the same portion creates a signal s142 for clearing the values attached to the memory 124 for the current blocks, and sends it to memory 124. So much for the description of a series of operations performed by the data transmission controller.

Figure 5:
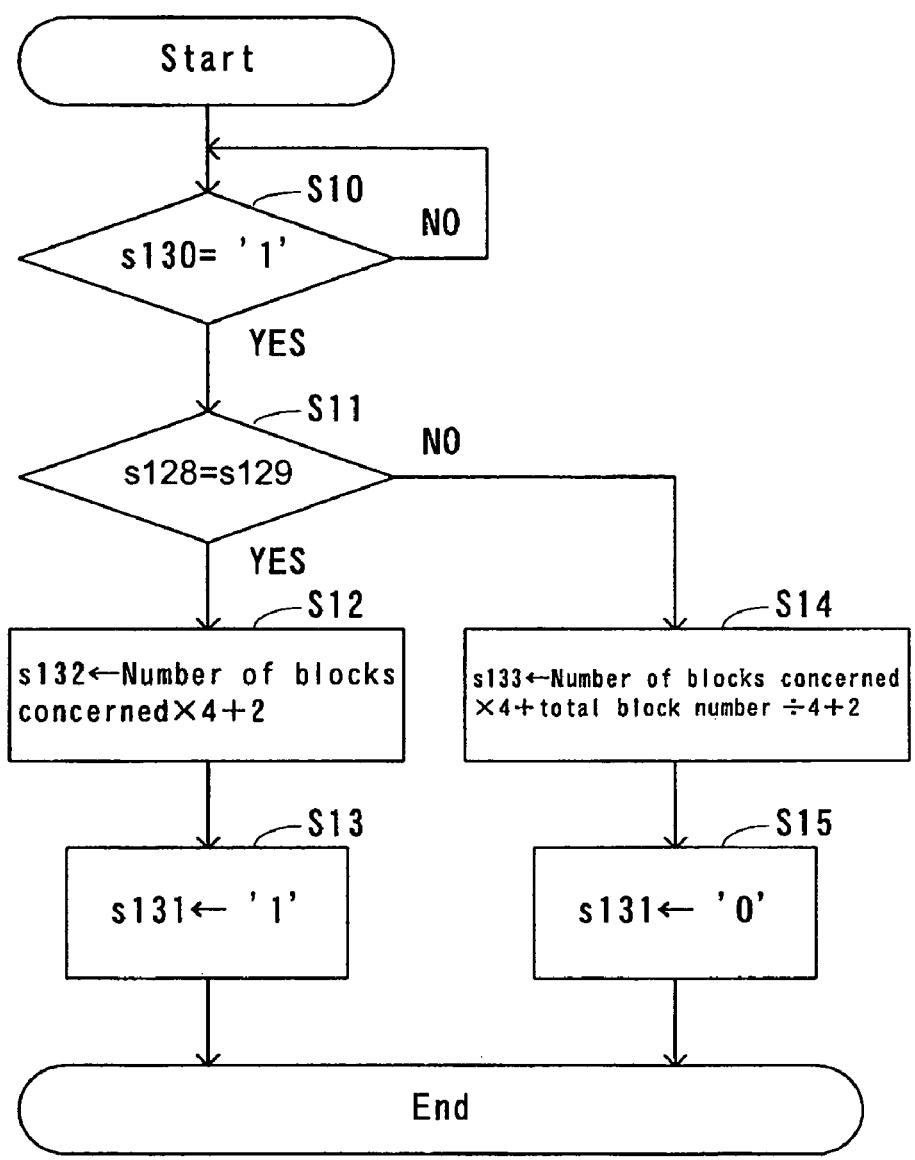
FIG. 5 is a flowchart to indicate the processes achieved by a data block comparing/calculating portion.

[Operation of block comparing/calculating portion] FIG. 5 is a flowchart to indicate the processes achieved by a data block comparing/calculating portion. At step S10, the block comparing/calculating portion 126 checks whether or not it has received an instruction signal s130 from control portion 126 which urges portion 123 to make a comparison/calculation, and when the same portion finds it has received the instruction signal s130 in question, it proceeds to step S11. Here, the block comparing/calculating portion 126 compares block information s128 of the current blocks with block information s129 of the previous blocks. When the portion 126 finds the two are the same, it proceeds to step S12 and makes a calculation consisting of multiplying the number of blocks by 4 and adding 2 (the number of clock signals required for the start bit and the setting of the mode) to the answer, and obtains the number of clock signals required for transmitting the data on the burst mode. At step S13, the portion 126 hoists a flag s131 signifying the current data may be transmitted on the burst mode. On the other hand, if the block comparing/calculating portion 126 finds the block information s128 of current data does not coincide with the block information s129 of previous data, it proceeds to step S14, and makes a calculation consisting of multiplying the number of blocks by 4 and adding 2 (the number of clock signals required for the start bit and the setting of the mode) to the answer, and of further adding the number of clock signals required for the setting of block information, to the previous answer, to obtain thereby the number of clock signals required for transmitting the current data on the block mode. In this way, the portion 126 calculates the number of clock signals required for transmitting the current data for each one of the communication modes. However, if the current data must be sent through the full mode, the number of clock signals required for the transmission will be 34, and thus no additional calculation will be necessary, as long as the same number of data are transmitted through this mode.

Figure 6:
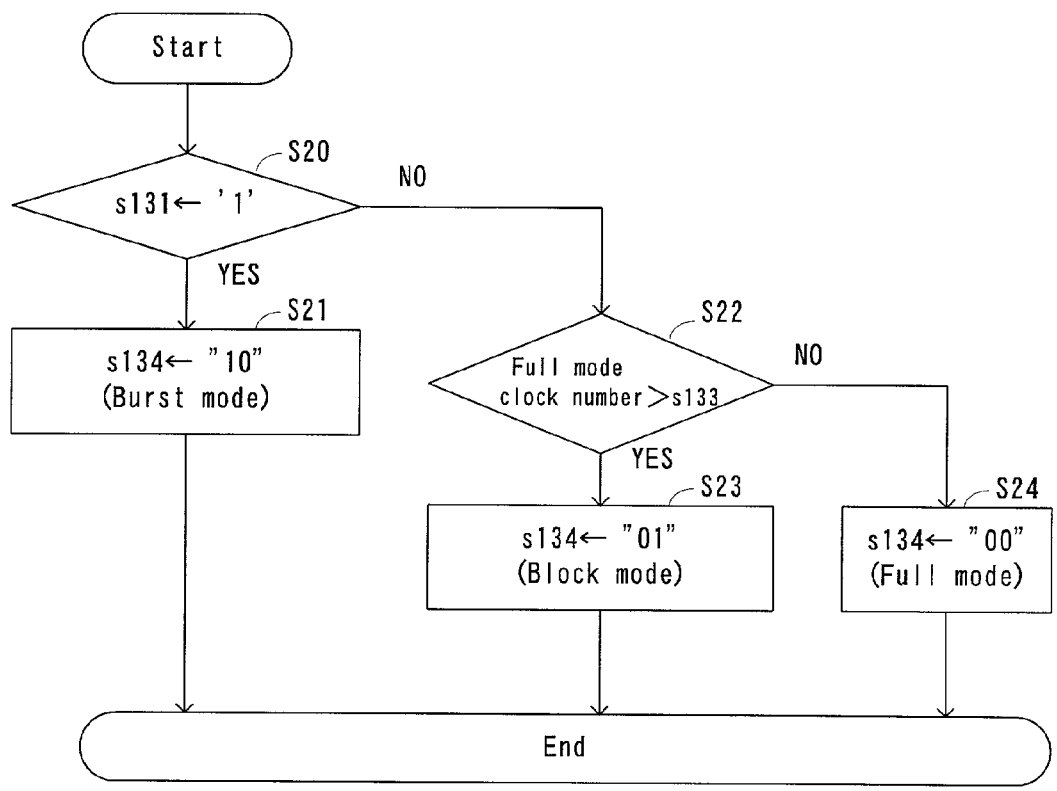
FIG. 6 is a flowchart to indicate the processes achieved by a decision portion.

[Operation of decision portion] FIG. 6 is a flowchart to indicate the processes achieved by a decision portion 127. At step S20, the portion in question checks whether or not there is hoisted at block comparing/calculating portion 126 a flag s131 signifying the two blocks coincide with each other, and when it finds the flag is hoisted, it proceeds to step S21. At step S21, the decision portion 127 determines whether the current data transmission should be made on the mode giving the less calculation result out of values of signals s132 and s133 (or whether the current data transmission should occur on the block mode or on the burst mode), or whether all the current data should be transmitted on the full mode to replace all the previous data stored in the data register 122. On the contrary, when the decision portion finds the flag in question is not hoisted, it proceeds to step S22. At step S22, decision portion 127 compares the number of clocks signals required for transmitting the data on the block mode obtained by the block comparing/calculating portion 126 and informed through signal s133, with the corresponding number required for transmitting the same data on the full mode. If decision portion 127 finds, as a result of comparison, transmission of the data on the full mode will require less clock signals, at step S24, the portion 127 delivers a signal s134 ("00") signifying the data will be transmitted on the full mode, to the output circuit portion. On the contrary, if decision portion 127 finds transmission of the data on the block mode will require less clock signals, the portion proceeds to step S23, and delivers a signal s134 ("01") signifying the data will be transmitted on the block mode, to the output circuit portion.

Figure 7:
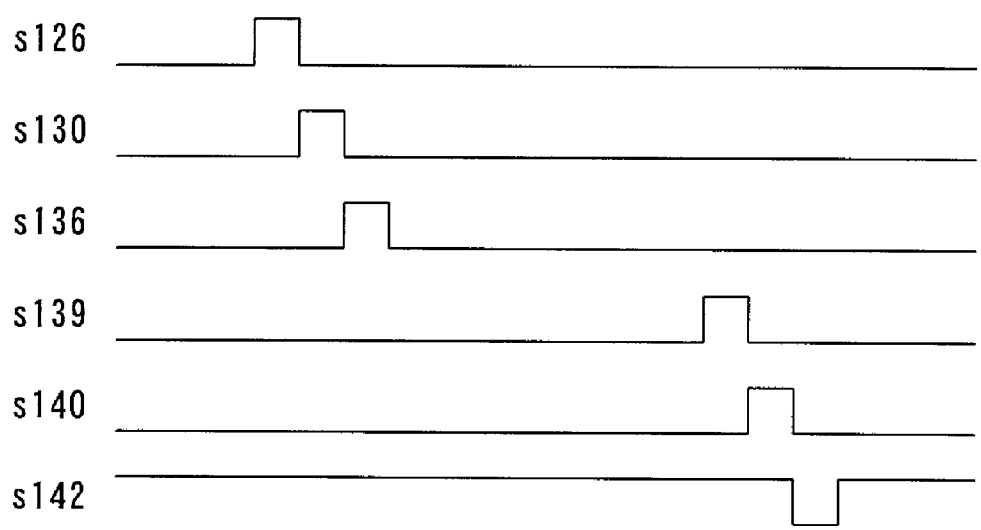
FIG. 7 is a timing chart of operations at a control portion.

[Operation of control portion] FIG. 7 is a timing chart of operations at the control portion 123. Control portion 123, on receipt of a start trigger signal s126 dispatched by the address decoding portion 121, firstly delivers an instruction signal s130 to the block comparing/calculating portion to instruct it to make a comparison/calculation. Then, the portion 123 delivers an output trigger signal s136 to the output circuit portion to urge the latter to deliver output. Later, the control portion 123, on receipt of an output completion signal s139 signifying the completion of output delivery from the output circuit portion, creates an enable signal s140 in order to transfer the block information stored in the memory for current blocks to the memory for previous blocks, and transmits it to the memory for previous blocks.

Then, the same portion 123 creates a signal s142 for clearing the data stored in the memory for current blocks, and sends it to the memory.

Figure 8:
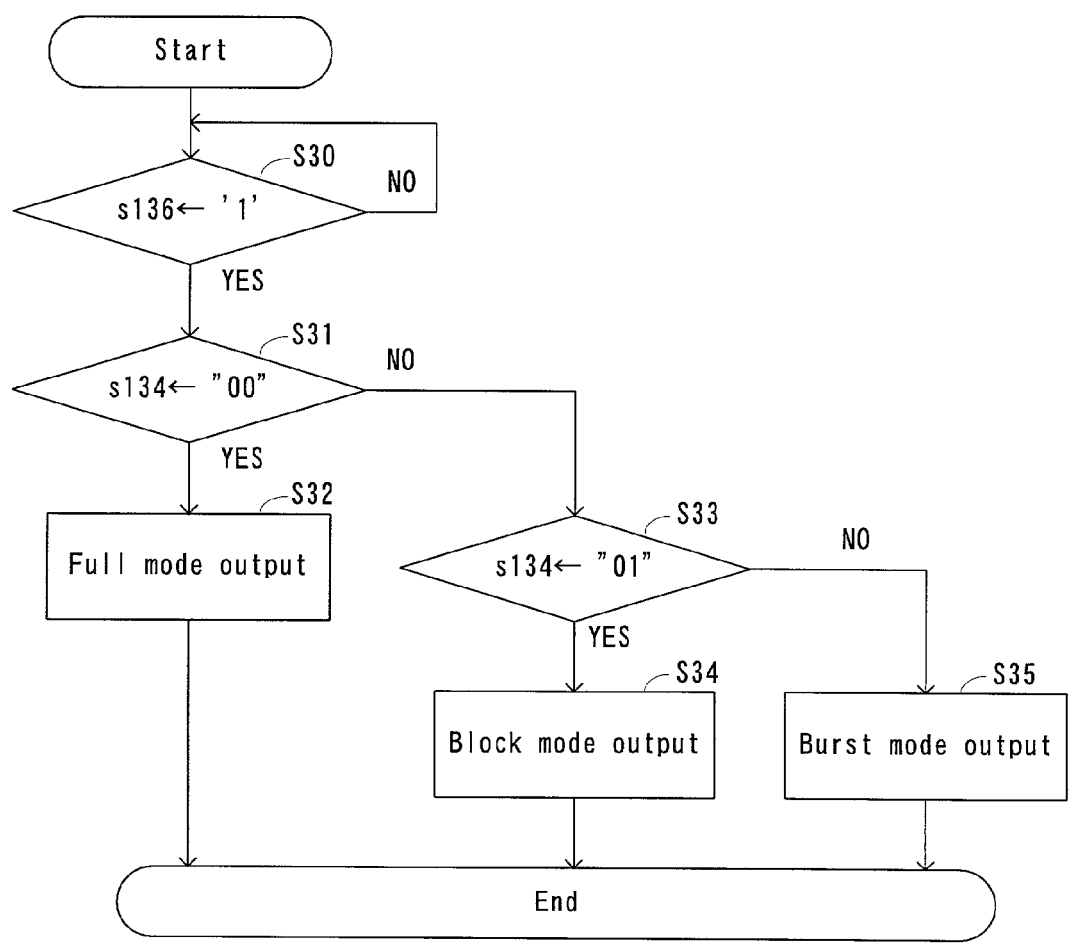
FIG. 8 is a flowchart to indicate the output flow of an output circuit portion.

[Operation of output circuit portion] FIG. 8 is a flowchart to indicate the output flow of the output circuit portion 128. When output circuit portion 128 finds, at step S30, it has received an output trigger s136 from the control portion, it decodes a mode information s134 dispatched by the decision portion to identify the mode for data transmission, and delivers data according to the mode thus identified. Specifically, at step S31 output circuit portion 128 checks whether or not the mode information s134 is "00". When it finds the information in question is "00", it proceeds to step S32, and fetches data stored in the data register portion 122, and delivers those data to the data reception controller on the full mode as indicated in FIG. 2(a). Alternatively, when it finds at step S31 the mode information s134 is not "00", it proceeds to step S33, and checks whether or not the information s134 is "01". When it finds the answer is affirmative, it proceeds to step S34, and delivers relevant data to the data reception controller on the block mode as indicated in FIG. 2(b). Alternatively, when output circuit portion 128 finds at step S33 the mode information s134 is not "01", it proceeds to step S35, and delivers relevant data to the data reception controller on the burst mode as indicated in FIG. 2(c).

Figure 9:
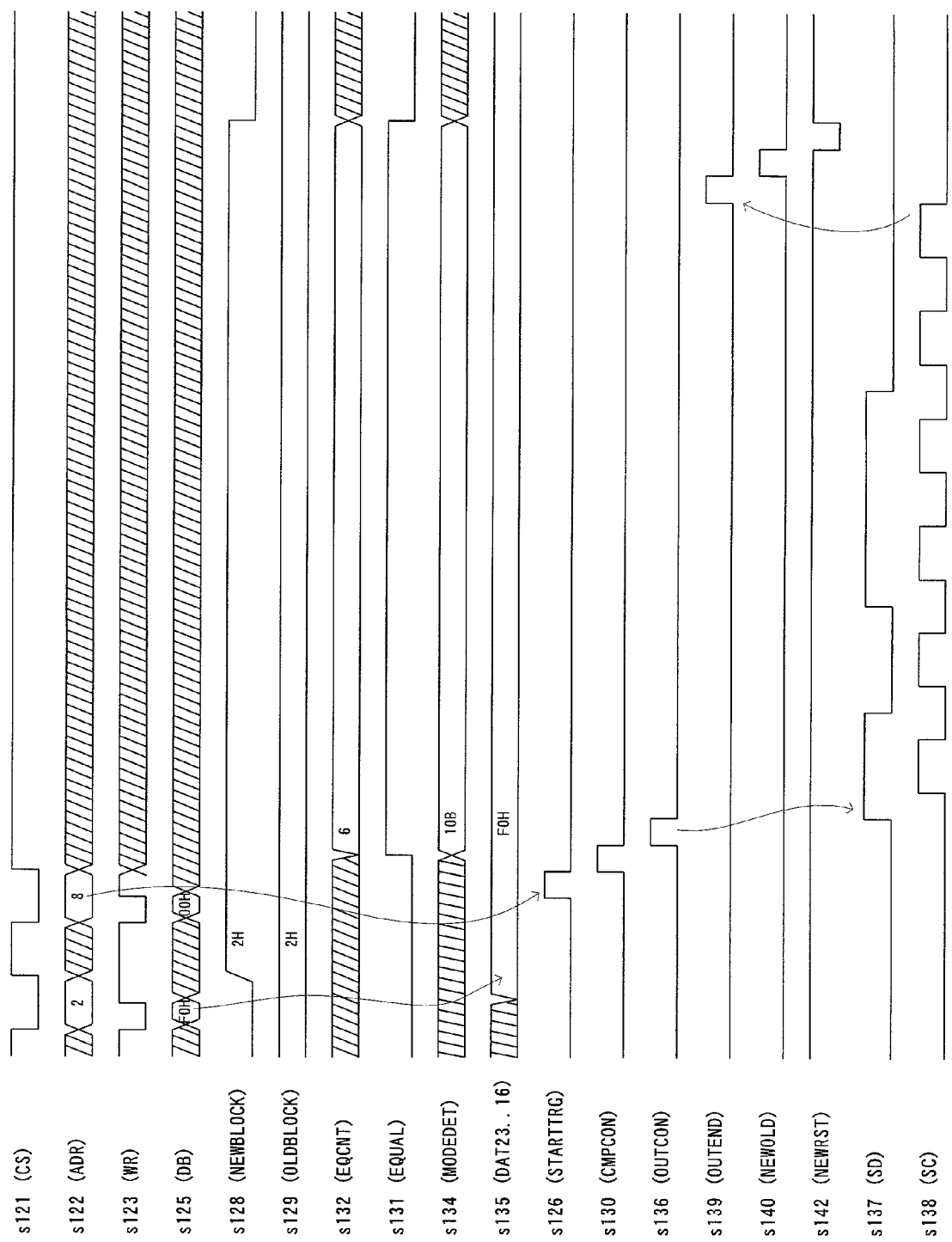
FIG. 9 is a timing chart of a data transmission controller.

[Timing chart of data transmitting elements] FIG. 9 is a timing chart of the data transmission controller. In FIG. 9, an F0hex is written into the block 2 through the burst mode. CPU sends a chip select signal s121 and a write signal s123 to the address decoding portion, as well as an address signal s122 signifying the location 2 to be addressed simultaneously. Data s125 based on F0hex are written in the data register portion. The signal s135 of FIG. 9 signifies data based on F0hex are stored in the block 2 of data register portion. The address decoding portion writes the information about the block in which data has been currently replaced, into the memory for current blocks. In response to this action, a signal s128 to be dispatched from the memory for current blocks is modified such that the signal s128 for the address 2 is raised to a high level to indicate the address 2 (block 2) of data register portion has undergone a replacement of data. FIG. 9 represents a case where data transmission occurs on the burst mode, and thus, a signal s129 to be dispatched from the memory for previous blocks is also raised to a high level at address 2, in a similar manner to the signal s128. Moreover, because data are transmitted on the burst mode in this case, a signal s131 signifying the current block information is the same with the previous block information is also kept at a high level. Next, CPU sends an address signal s122 notifying address 8 to the address decoding portion and writes data s125 based on 00hex in it. The signal notifying address 8 relates to command data, and not to data to be transferred. The address decoding portion, if it finds data are present at address 8, interprets it as representing CPU dispatches a data transmission start command. The data s125 contains 00hex, but this data do not have any specific meaning. The address decoding portion, on receipt of the data transmission start command, creates a start trigger signal s126, and delivers it to the control portion. The control portion, on receipt of the start trigger signal s126, firstly sends a comparison/calculation trigger signal s130 to the block comparing/calculating portion. Then, the control portion delivers an output trigger signal s136 to the output circuit portion. The block comparing/calculating portion, on receipt of the comparison/calculation trigger signal s130, compares signal s129 with signal s128, and, if it finds the two signals coincide with each other, hoists a flag s131 signifying coincidence, and then calculates the number of data required for transmitting the data on the burst mode or on the block mode, and creates signals s132 and s133 based on the former and latter calculation results respectively. In this particular example, data will be transmitted on the burst mode, and thus, the signal s132 of FIG. 9 represents 6 (6D) based on decimal notation. The decision portion 127, based on the information conveyed by signals s131, s132 and s133 (not illustrated), delivers a mode information s134. In this particular case, as data will be transmitted on the burst mode, the mode information s134 of FIG. 9 represents "10" on binary notation. Output circuit portion 127, on receipt of an output trigger s136 from control portion 123, reads the data s135 stored in the data register portion, and transmits data s137 to be transmitted and clock signals s138 according to the mode information s134. Of a series of clock signals associated with the data, the first 2 clock signals concern with the information of the initial setting; the succeeding 4 clock signals relate to the transmission of data corresponding to the block 2 (data corresponding to 23rd to 16th bit) in this particular example. When transmission of data is completed, the output circuit portion informs the control portion 123 of the completion of data transmission by sending an output completion signal s139. The control portion, on receipt of the signal s139, creates a write enable signal s140 with an intention to transfer the block information stored in the memory 124 for current blocks to the memory 125 for the previous blocks, and transmits it to the memory 125 for previous blocks. Then, the same portion creates a signal s142 for clearing the values stored in the memory 124 for the current blocks, and sends it to memory 124. So much of the description of a serial of transmitting operations performed.

Figure 10:
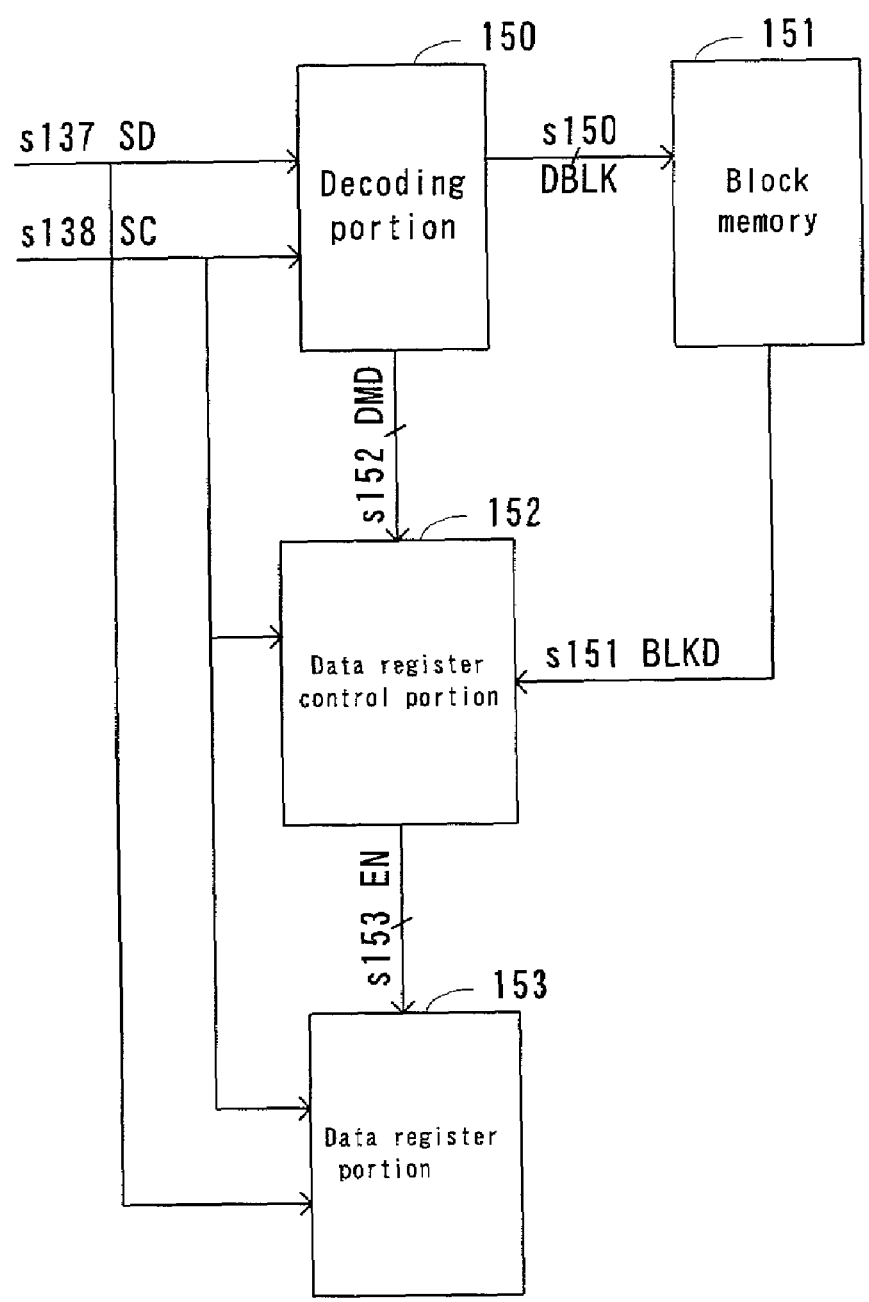
FIG. 10 is a block diagram of a data reception controller.

[Constitution of data reception controller] FIG. 10 is a block diagram of the data reception controller. The data reception controller comprises a decoding portion 150 to decode the information carried by data s137 and clock signals s138 received, a block memory 151 to store the block information received, a data register portion 153 to store the data received, and a data register control portion 152 to deliver an enable signal which signifies that the data received are assigned to which locations of the data register portion 153, based on the mode information s152, block information s151 and clock signals s138.

Figure 11:
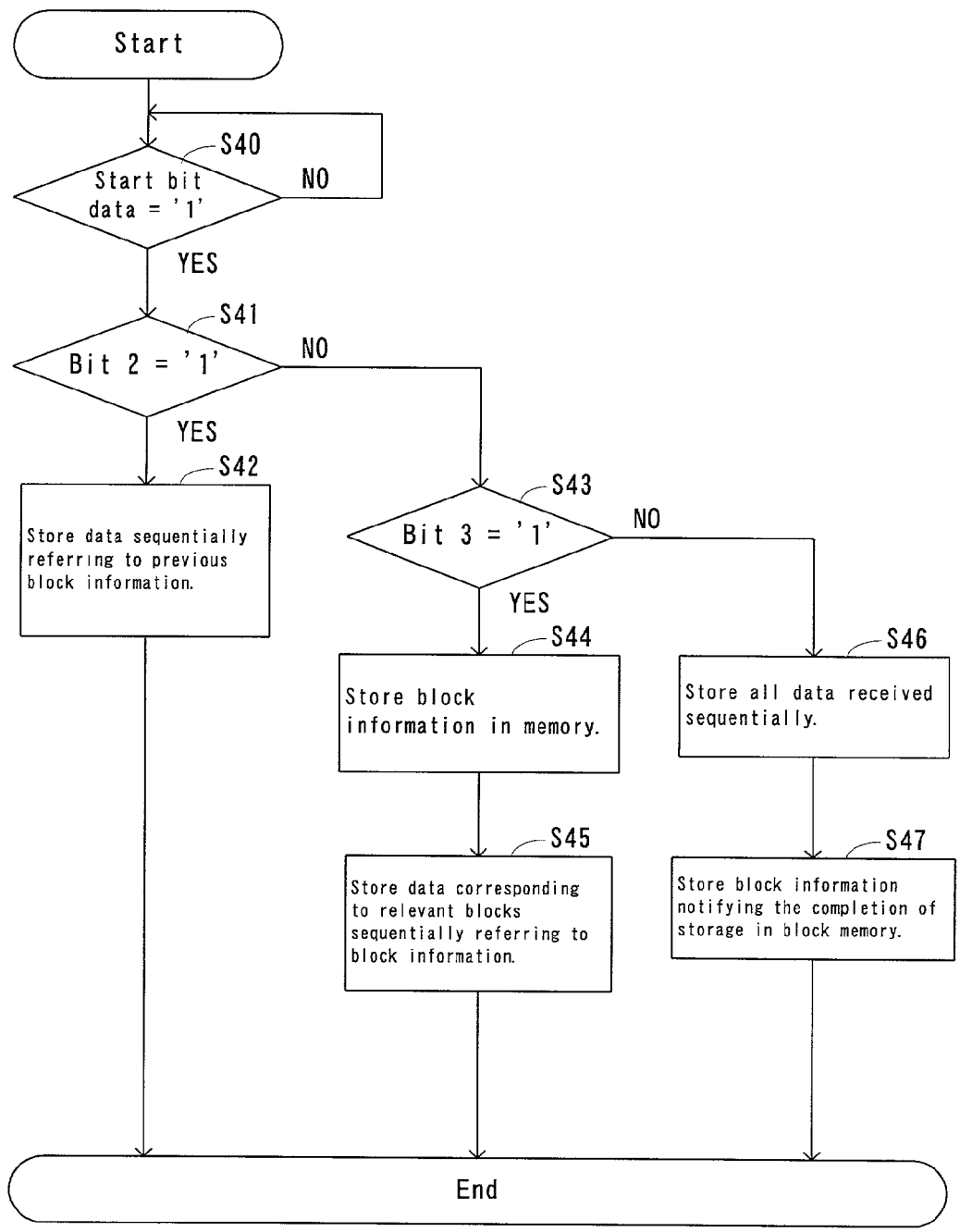
FIG. 11 is a flowchart to indicate the operation of the data reception controller.

[Operation of data reception controller] FIG. 11 is a flowchart to indicate the operation of the data reception controller. At step S40, when decoding portion 150 detects the data of a start bit is "1", data reception becomes ready. At step S41, the data reception controller checks whether or not the data of the second bit is "1", and, when it finds the data in question is "1", it proceeds to step S42. At step S42, the data reception controller handles the data received, and performs the operation of the burst mode, that is to say, stores the data one after another in the relevant block of the data register portion, by referring to the previous block information. If at step S41 the data reception controller finds the data of the second bit is not "1", it proceeds to step S43, and checks whether or not the data of the third bit is "1". If the controller finds the data in question is "1", it proceeds to step S44, and handles the data received, and performs the operation of the block mode, that is to say, stores, in the block memory, the block information notifying whether or not data for each block should be written into the memory, according to the signals subsequently transmitted. Then, the data reception controller stores the data corresponding to the relevant block in a descending order of block in the data register portion, by referring to the block information stored in the block memory. However, if at step S43 the data reception controller finds the data of the third bit is not "1", it proceeds to step S46, and handles the data received, and performs the operation of the full mode, that is to say, stores all the transmitted data in a descending order in the data register. Then, at step S47, it stores the block information notifying all the data corresponding to every block have been completely written, into the block memory.

Figure 12:
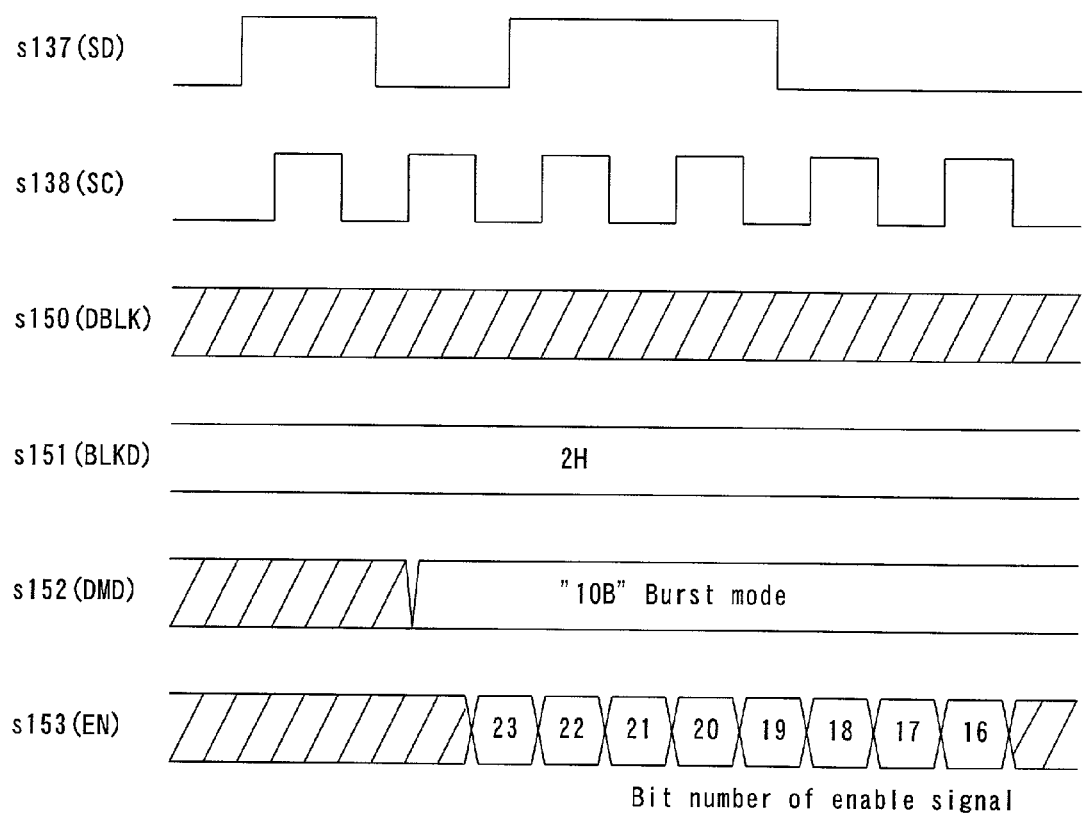
FIG. 12 is a timing chart of the data reception controller.

FIG. 12 is a timing chart of the data reception controller. This figure concerns with a case where data transmission occurs on the burst mode, and data based on F0hex is written into the block 2 on the burst mode. Because the current data transmission will occur on the burst mode, the previous block information is stored in the block memory 151, which is indicated by a signal s151 kept at a high level for the block 2. The data reception controller, based on the signal s151, can identify, for a given data received, the block of memory into which the data should be stored. The data reception controller, by referring to the data of the 2nd and 3rd bits subsequent to a start bit, finds the current transmission mode is the burst mode, sets a signal s152 to "10" which is data indicative of the burst mode, and sends the signal to the data register control portion 152. The data register control portion 152, based on the mode information s152 and the block information s151, creates an enable signal s153 which is a select signal for allocating the data transmitted in association with clock signals from the 5th bit onward, to their proper addresses, and sends the signal to the data register portion 153 so that the data from the 5th bit onward are properly stored there. The data stored in the data register portion 153 are then sent to a printer head as printing data.

2nd Embodiment

Figure 13:
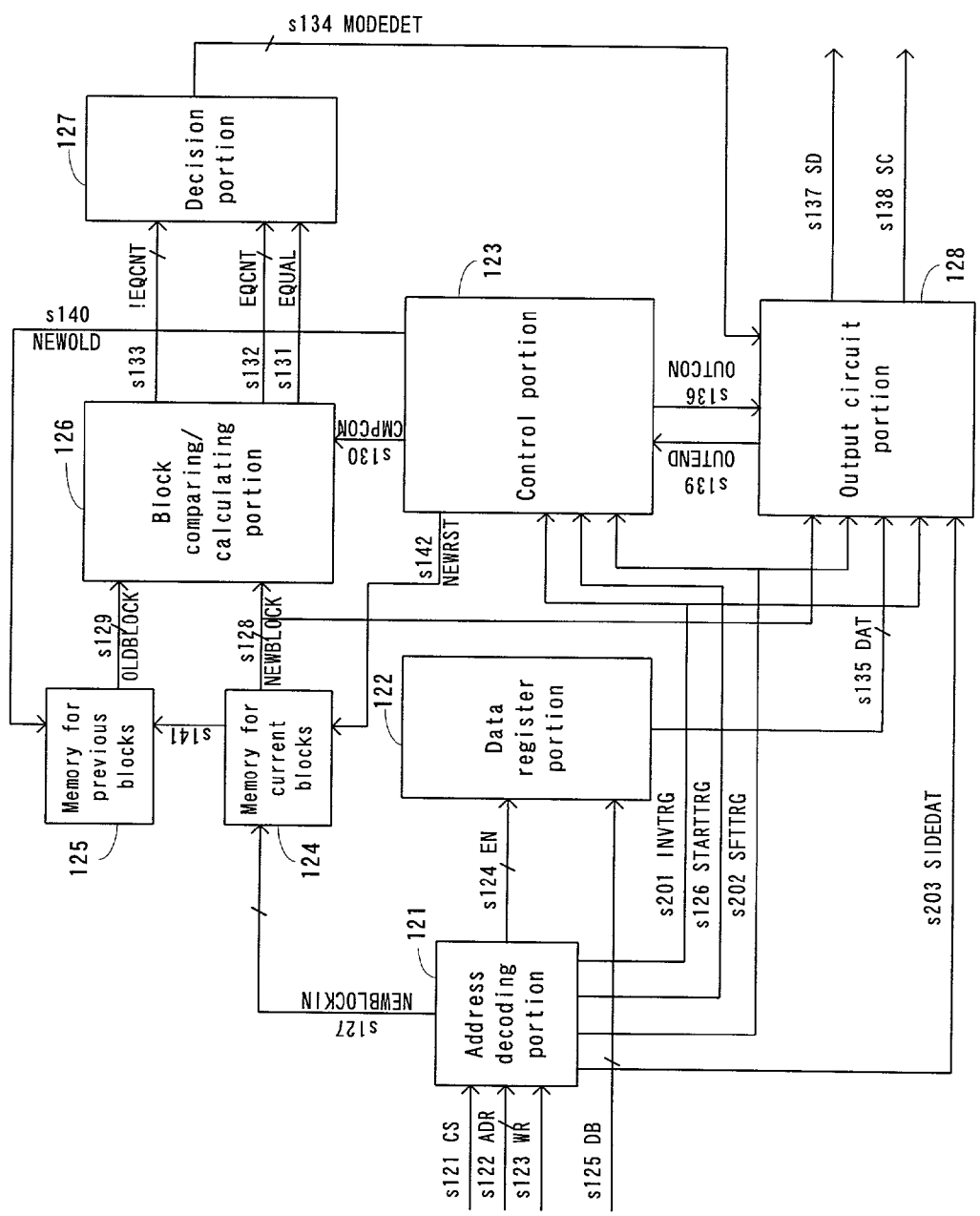
FIG. 13 is a block diagram of a data transfer controller representing a second embodiment.

[Constitution] Next, the second embodiment of this invention will be described with reference to the attached drawings. FIG. 13 is a block diagram of the data transmission controller of an image forming system based on thermal ink jet printing representing a second embodiment. The data transmission controller of the second embodiment shown in FIG. 13 is different from the corresponding controller of the first embodiment shown in FIG. 4 in that, in the former, an address decoding portion creates an invert trigger s201, shift trigger s202 and side data s203, and deliver them as output. Otherwise the former is the same with the latter. Hence, the elements of the second embodiment having functions similar to those of the first embodiment will be represented by the same symbols, and their detailed description will be omitted. The elements of the second embodiment similar to those of the first embodiment will be omitted from further description. The invert trigger s201 carries an instruction for inverting data already sent to the data receiving elements. The shift trigger s202 carries an instruction for shifting data already sent to the data receiving elements by a specified number of bits. The side data s203 represent the data placed at the bit end after the data has been shifted by a specified number of bits under the influence of a shift trigger. The data transmission controller identifies the contents of signals s201, s202 and s203, by decoding addresses sent by CPU. For example, an agreement is made such that address 9 is assigned to signal s201, address 10 to signal s202 and address 11 to signal s203.

Figure 14:
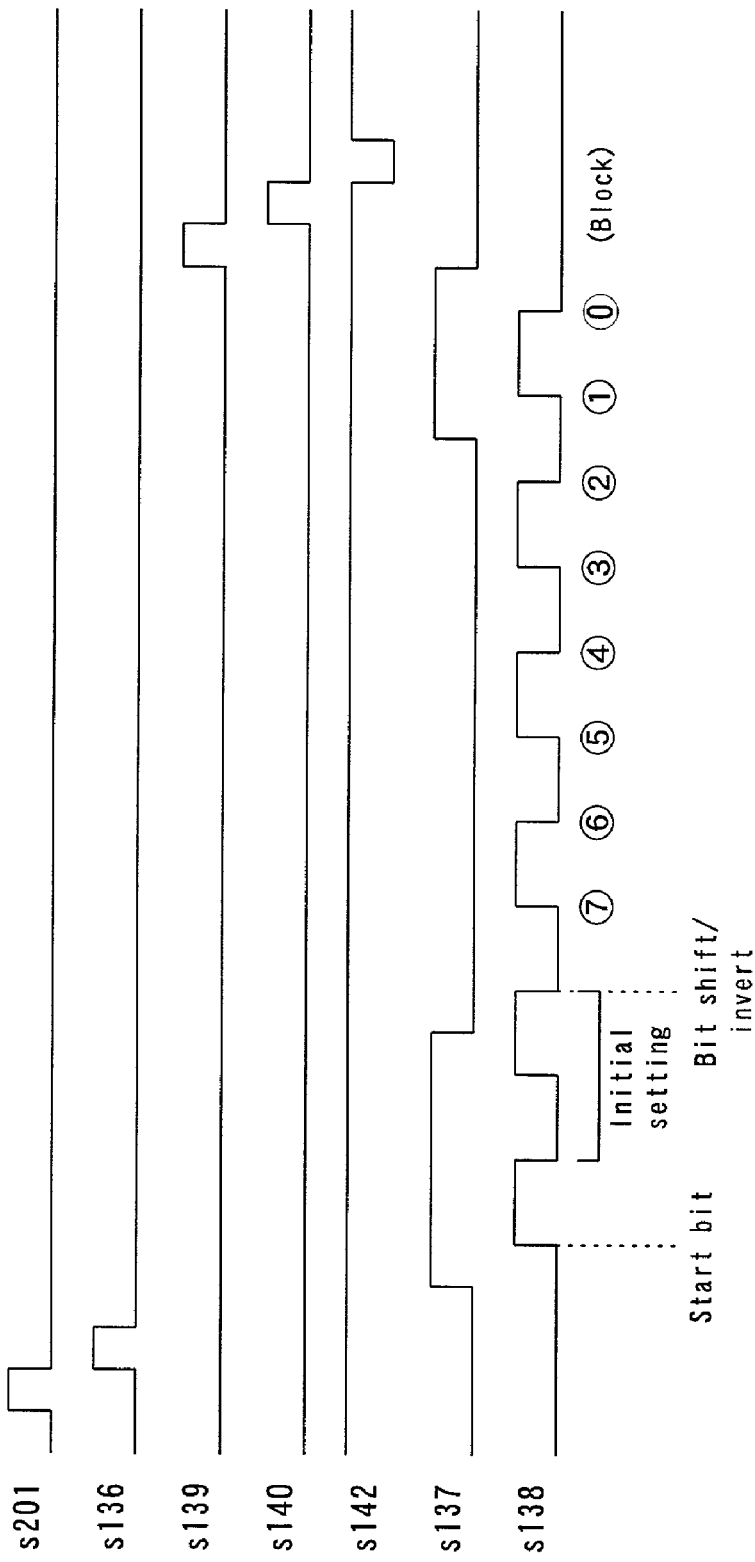
FIG. 14 is a timing chart of signals when an invert command is transmitted.

[Operation] Let's assume the data transmission controller receives from CPU instructions to invert the data corresponding to the blocks 1 and 0 respectively. Address decoding portion 121 decodes the instructions, and causes the memory for current blocks to store the block information carrying the instruction to invert the data corresponding to the blocks 1 and 0 respectively. In addition, the address decoding portion 121 creates an invert trigger s201, and sends it to output circuit portion 128. The output circuit portion 128, on receipt of the invert trigger s201, recognizes data to be inverted must be the data corresponding to the block 1 and 0 based on a signal s128, and sends the information about the data corresponding to the blocks to be inverted as well as the invert trigger to the data receiving elements. FIG. 14 is a timing chart of signals when an invert trigger s201 is transmitted. When the address decoding portion 121 sends an invert trigger s201 to the control portion 123 and the output circuit portion 123, the control portion 123 creates an output trigger s136, and sends it to the output circuit portion 128. The output circuit portion 128, on receipt of the output trigger s136, sends information carrying the instruction to invert the data corresponding to the blocks 1 and 0 to the data receiving elements in synchrony with clock signals. Specifically, the output circuit portion 128 sets the data corresponding to a start bit to 1, and both of the data corresponding to the 2nd and 3rd bits to 1. The last bit array indicates the data to be transmitted after this concern with an instruction. The same portion 128 further sets the data of the 4th bit to 0 which indicates the instruction concerns with the inversion of data. The bit arrays from 5th to 12th bits are portions for setting the block information, and in this particular example, the data of 11th and 12th bits are set to 1.

Figure 15:
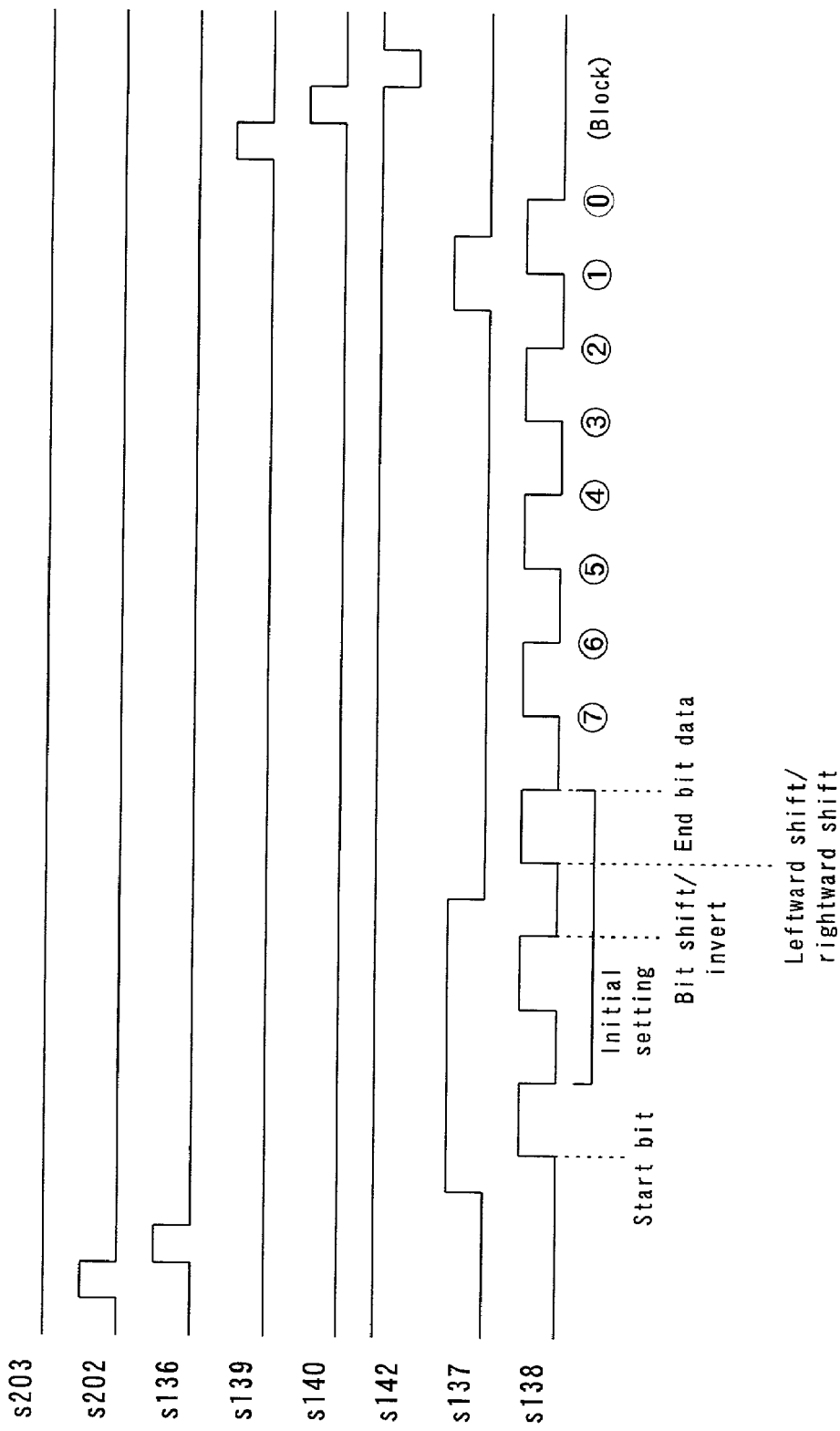
FIG. 15 is a timing chart of signals when a bit shift command is transmitted.

With reference to FIG. 15, description will be given of a case where the data transmission controller receives from CPU instructions to shift the data corresponding to the block 1 by one (1) bit rightward (towards a lower position) and to set the most significant bit of the data corresponding to the block 1 being shifted, to 0. FIG. 15 is a timing chart of signals when a shift trigger s202 is transmitted. When the data transmission controller receives those instructions, the address decoding portion 121 sends a shift trigger s202 to the control portion 123 and the output circuit portion 128. The control portion 123, on receipt of the shift trigger s202, sends an output trigger s136 to the output circuit portion 128. The output circuit portion 128, on receipt of the output trigger s136, transmits, to the data receiving elements, information carrying the instruction to shift the data corresponding to the block 1 by a specified number of bits, in synchrony with clock signals. Specifically, the output circuit portion 128 sets the data corresponding to a start bit to 1, and both of the data corresponding to the 2nd and 3rd bits to 1. The same portion 128 further sets the data of the 4th bit to 1, indicating the instruction concerns with the shift of data; the data of 5th bit to 0, indicating the shift should occur rightward; and the data of 6th bit to 0, indicating the end bit is set to 0. The bit arrays from 7th to 14th bits are portions for setting the block information, and in this particular example, the data corresponding to 13th bit is set to 1.

Figure 16:
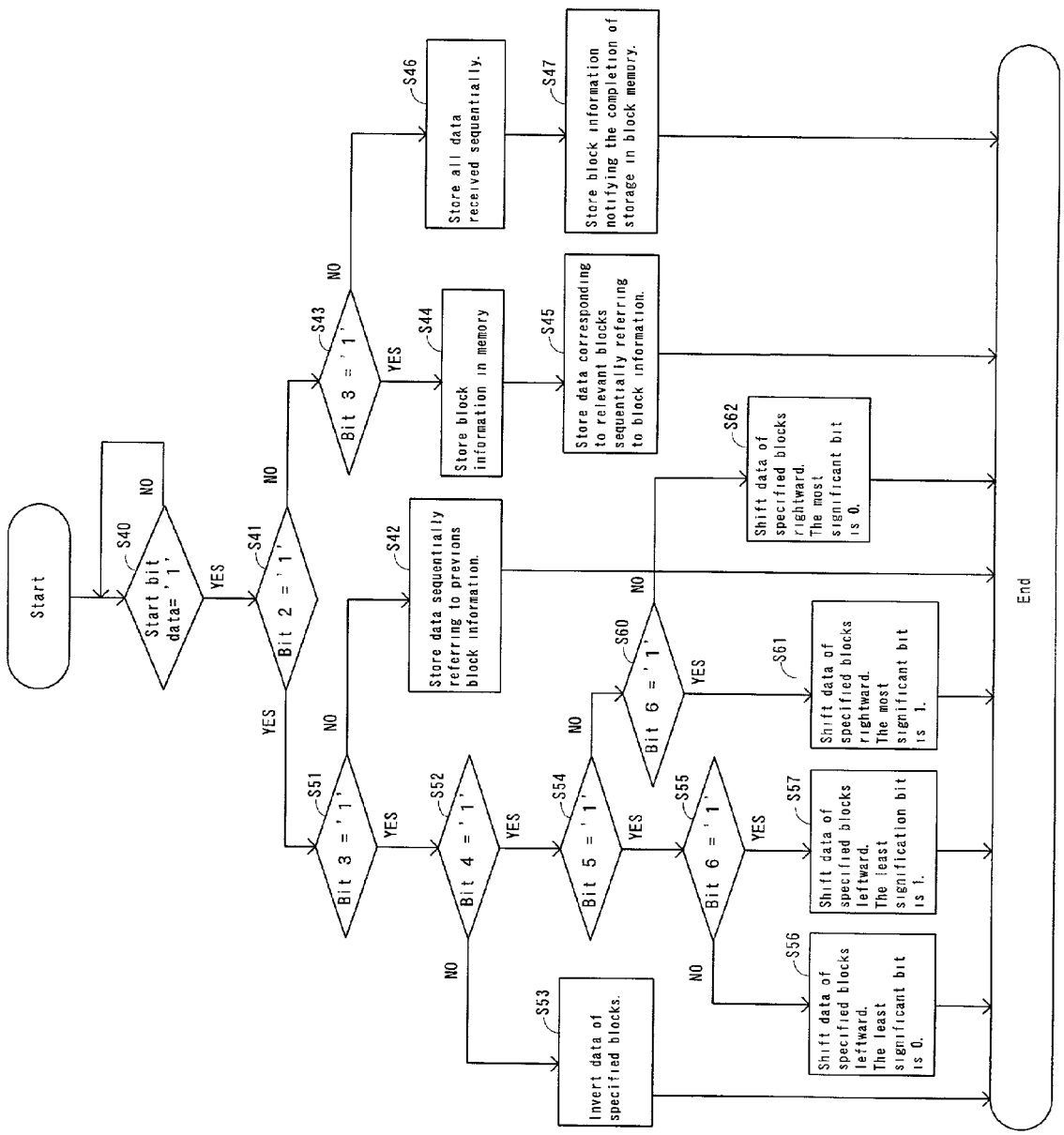
FIG. 16 illustrates the flow of processes of a data reception controller representing a second embodiment

FIG. 16 illustrates the flow of processes of a serial controller serving as one of the data receiving elements. It is the same with the corresponding one of the first embodiment shown in FIG. 11 in steps S40 to S47, and is different only in step S51 onward. Accordingly, here steps S40 to S47 will be omitted from description, and only step S51 onward will be described. When the serial controller finds, at step S41, the data of 2nd bit is 1, it proceeds to step S51. Then, it checks whether or not the data of 3rd bit is 1. When the serial controller finds the data in question is not 1, it proceeds to step S42, and performs similar operations as in step S42 of the first embodiment. On the contrary, if the serial controller finds, at step S51, the data of 3rd bit is 1, it proceeds to step S52, and checks whether or not the data of 4th bit is 1. When the controller finds the data in question is not 1, it proceeds to step S53, and inverts the data corresponding to the specified blocks. On the contrary, if the serial controller finds the data of 4th bit is 1, it proceeds to step S54, and checks whether or not the data of 5th bit is 1. When it finds the data in question is 1, it proceeds to step S55, and checks whether or not the data of 6th bit is 1. When the serial controller finds the data of 6th bit is not 1, it proceeds to step S56, shifts the data corresponding to the specified blocks leftward, and sets the least significant bit to 0. On the contrary, if the serial controller finds, at step S55, the data of 6th bit is 1, it proceeds to step S57, shifts the data corresponding to the specified blocks leftward, and sets the least significant bit to 1. When the controller finds, at step S54, the data of 5th bit is not 1, it proceeds to step S60, and checks whether or not the data of 6th bit is 1. If it finds the data in question is 1, it proceeds to step S61, shits the data corresponding to the specified blocks rightward, and sets the most significant bit to 1. If it finds the data of 6th bit is not 1, it proceeds to step S62, shifts the data corresponding to the specified blocks rightward, and sets the most significant bit to 0.

As it is possible according to this embodiment to invert or shift data corresponding to any desired block sent to the data receiving elements by using an invert command and a shift command as mentioned above, and simply transmitting the invert command or the shift command together with the block information, transmitting data will occur faster as compared with the first embodiment where transmission of data occurs in the three different communication modes.

[Advantages obtained from the embodiments] According to the embodiments described above, it is possible to automatically select, through the arrangement of hardware element, a mode out of the three communication modes available that is most appropriate for quickly transmitting given data, based on the data written by an external computer or the like, and to transmit the data. The data receiving element stores the data thus received into the register according to the content of mode information attached to the data. Through this arrangement it is possible for the data receiving element to reduce the time necessary for serial communication, without being conscious of the speed of serial communication. Further, if the system desires, of the data already sent to the data receiving element, to shift a certain bit, or to invert a certain bit, the system can achieve the object by creating a shift command or an invert command, and simply attaching the command to the block information, which will relieve the system of the necessity of preparing bit shifts or bit inverts for individual data involved as in the conventional system. This will further contribute to the contraction of the time necessary for serial communication.

[Other possible embodiments] This invention, however, is not limited to the above embodiments, and various modifications thereof will be possible within the scope of this invention. For example, according to the above embodiments, description has been given on the assumption that a block of data has an eight (8) bit length. However, a block of data may have a length equal to 16 bits, 32 bits, etc. Further, according to the above embodiments, description has been given on the assumption that this invention is embodied in an image forming system. However, this invention is not limited to such equipment. For example, this invention may be profitably utilized for common communication based on communication lines. Furthermore, according to the above embodiments, data communication may occur on the block mode, burst mode or full mode. However, data communication supported by this invention is not limited to this case: data communication based on this invention may occur on the block mode alone, on either the block mode or burst mode, or on either the block mode or full mode.

INDUSTRIAL APPLICABILITY

As discussed above, this invention provides a method for synchronous serial communication whereby it is possible to reduce the time required for data transmission as compared with the conventional communication method, by dividing serial data to be transmitted into a plurality of blocks, to firstly transmit a block information, and then to transmit data corresponding to the block notified by the block information.

As the method makes the system to choose any one among the three communication modes consisting of the first, second and third modes, it is possible for the system to choose, according to data to be transmitted, the mode that allows the fastest transmission of the data.

It is possible to further reduce the time for data transmission by creating a command for treating the data already sent to the data receiving element, and a block information, then by sending them to the data receiving element, and by treating the data corresponding to the block already sent to the data receiving element.

As discussed above, the method for synchronous serial communication and the system for serial communication of this invention are applicable to the image forming system based on thermal ink jet printing, or to the common communication based on communication lines.

The invention claimed is:

1. A system for synchronous serial communication which comprises a serial data transmitting component comprising:
 a storage means to store data fed by an external device;
 a clock that produces a clock signal having clock signal level transitions;
 a decision means to calculate a number of clock signal level transitions required for the transmission of said data for each of a number of transmission modes, and to decide which mode will allow the serial transmission of said data to occur in the least number of clock signal level transitions; and
 an output means to choose the mode which has been decided by the decision means as allowing the serial transmission of said data to occur in the least number of clock signal level transitions, to read said data stored in the storage means, and to transmit said data through the communication mode thus chosen, wherein
 there are available a first mode, which is a serial communication under which data are transmitted without being divided into blocks, and a second mode under which data to be transmitted are divided into blocks, firstly transmitted is block information notifying the block(s) to be transmitted, and secondly transmitted are the data included in the block(s) notified by the block information, and, on the data included in the block(s) not notified, the corresponding previous data stored in a data receiving component are used; and
 time required for a data transmission based on the first mode, and time required for the data transmission based on the second mode are calculated, and compared, and transmission of the data is achieved through the mode that is found have less time for transmission of the data.

2. The system of claim 1, wherein, when it is required to transmit data, mode information notifying under which mode the transmission of the data will be achieved is attached to the data to be transmitted.

3. The system of claim 1, wherein the serial data are divided into blocks by bytes.

4. A system for synchronous serial communication which comprises a serial data receiving component comprising:
   a storage means to store data:
   an analysis means to identify a communication mode of serially received data based on a received mode information; and
   a control means to cause the received data to be stored in the storage means according to the mode identified by the analysis means, wherein
   there are available a first mode, which is a serial communication under which data are transmitted without being divided into blocks, and a second mode under which data to be transmitted are divided into blocks, firstly transmitted is block information notifying the block(s) to be transmitted, and secondly transmitted are the data included in the block(s) notified by the block information, and, on the data included in the block(s) not notified, the corresponding previous data stored in a data receiving component are used; and
   time required for a data transmission based on the first mode, and time required for the data transmission based on the second mode are calculated, and compared, and transmission of the data is achieved through the mode that is found have less time for transmission of the data.

5. The system of claim 4, wherein, when it is required to transmit data, mode information notifying under which mode the transmission of the data will be achieved is attached to the data to be transmitted.

6. The system of claim 4, wherein the serial data are divided into blocks by bytes.

7. A system for synchronous serial communication which comprises a serial data transmitting component comprising:
   a memory coupled to receive and store data fed by an external device;
   a clock that produces a clock signal having clock signal level transitions;
   a processing unit which calculates a number of clock signal level transitions required for the transmission of said data for each of a number of serial transmission modes, and decides which mode will allow the serial transmission of said data to occur in the least number of clock signal level transitions; and
   a selector unit, which selects a mode which has been decided by the processing unit, to read said data stored in the memory and to serially transmit said data through the communication mode thus chosen, wherein
   there are available a first mode, which is a serial communication under which data are transmitted without being divided into blocks, and a second mode under which data to be transmitted are divided into blocks, firstly transmitted is block information notifying the block(s) to be transmitted, and secondly transmitted are the data included in the block(s) notified by the block information, and, on the data included in the block(s) not notified, the corresponding previous data stored in a data receiving component are used; and
   time required for a data transmission based on the first mode, and time required for the data transmission based on the second mode are calculated, and compared, and transmission of the data is achieved through the mode that is found have less time for transmission of the data.

8. The system of claim 7, wherein, when it is required to transmit data, mode information notifying under which mode the transmission of the data will be achieved is attached to the data to be transmitted.

9. The system of claim 7, wherein the serial data are divided into blocks by bytes.

10. A system for synchronous serial communication which comprises a serial data receiving component comprising:
    a memory which stores data,
    an analysis unit which identifies a communication mode of serially received data based on received mode information; and
    a control unit which causes the serially received data to be stored in the memory according to the mode identified by the analysis unit, wherein
    there are available a first mode, which is a serial communication under which data are transmitted without being divided into blocks, and a second mode under which data to be transmitted are divided into blocks, firstly transmitted is block information notifying the block(s) to be transmitted, and secondly transmitted are the data included in the block(s) notified by the block information, and, on the data included in the block(s) not notified, the corresponding previous data stored in a data receiving component are used; and
    time required for a data transmission based on the first mode, and time required for the data transmission based on the second mode are calculated, and compared, and transmission of the data is achieved through the mode that is found have less time for transmission of the data.

11. The system of claim 10, wherein, when it is required to transmit data, mode information notifying under which mode the transmission of the data will be achieved is attached to the data to be transmitted.

12. The system of claim 10, wherein the serial data are divided into blocks by bytes.

13. A method for synchronous serial communication, the method comprising the acts of:
    calculating an amount of time required for a data transmission based on a first serial transmission mode;
    calculating an amount of time required for a data transmission based on a second serial transmission mode;
    selecting either the first mode or the second mode so that serial data transmission take less time,
    wherein the transmitting of the data in the second mode comprises the acts of
    dividing the data into blocks;
    transmitting block information notifying the block(s) to be transmitted;
    transmitting only the data included in the block(s) notified by the block information; and
    using previously stored data in a data receiving component for the data included in the blocks(s) not notified.

14. A method for synchronous serial communication as described in claim 13, further comprising the acts of:
    serially transmitting the data in a third mode in which current block information is omitted after comparing the current block information with previously transmitted block information; and determining that the current block information and the previous block information are the same; and selecting the third mode for transmitting the data if the transmission time using the third mode is shorter than the transmission time using the using the first or second mode.

15. A method for synchronous serial communication as described in claim 13, wherein, when it is required to transmit data, mode information notifying under which mode the transmission of the data will be achieved is attached to the data to be transmitted.

16. A method for synchronous serial communication as described in claim 1, wherein, when it is required to transmit data, mode information notifying under which mode the transmission of the data will be achieved is attached to the data to be transmitted.

17. A method for synchronous serial communication as described in claim 15, 16, 13 or 14, wherein the serial data are divided into blocks by bytes.

18. A method for synchronous serial communication as described in claim 15, 16, 13 or 14, wherein, when it is required to transmit a command which concerns with the treatment of data already transmitted, firstly transmitted is command data indicating the current data carries a command concerning with the treatment of the data already transmitted, and then transmitted is said block information from which it is possible to identify the block(s) to be treated out of the data previously transmitted.

19. A method for synchronous serial communication as described in claim 18, wherein said command includes at least either an invert command or a bit shift command.

* * * * *